United States Patent Office 3,381,007
Patented Apr. 30, 1968

3,381,007
PURIFICATION OF PHENOTHIAZINE
Lawrence G. Vaughan, Wilmington, Del., and David N. Kramer, Stevenson, Md., assignors to the United States of America as represented by the Secretary of the Army
No Drawing. Filed May 2, 1966, Ser. No. 546,619
5 Claims. (Cl. 260—243)

ABSTRACT OF THE DISCLOSURE

A process for the purification of phenothiazine wherein an excess of 2,3-dihydropyran is exothermically reacted with phenothiazine in ether in the presence of a catalytic amount of a concentrated mineral acid.

---

The present invention relates to a purification process of a secondary aromatic amine and relates more particularly to the purification of phenothiazine.

Phenothiazine may be represented structurally as follows:

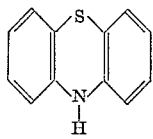

Commercial phenothiazine is very inexpensive on the market but at the same time as being economical it is always quite impure. Before it can be employed for instance as an insecticide or a medicinal for animals or as an intermediate in various chemical reactions, the impurities that are present in the commercial product have to be removed. Numerous methods exist for removing impurities from phenothiazine, but these methods are expensive and very time consuming. For instance, the procedures involve distillation with superheated steam and other methods involve several recrystallization steps.

It is the object of this invention to remove impurities from a commercial secondary aromatic amine.

It is the object of this invention to provide a rapid and simple purification method.

It is a further object of this invention to provide a method wherein an adduct is formed.

A further object of this invention is to provide a method for the production of phenothiazine which gives an analytical pure product.

Further objects and advantages of the present invention will appear herein.

In accordance with the present invention, it has now been found that the always present impurities in commercial phenothiazine may be removed by a rapid, direct, and simple purification process. In its broadest aspect, our process comprises contacting a slurry of phenothiazine in an anhydrous organic solvent such as ether, tetrahydrofuran, dimethylformamide, and dimethylsulfoxide with dihydropyran and a concentrated mineral acid such as hydrochloric, phosphoric, and sulfuric acid. A mild exothermic reaction occurs forming an adduct which precipitates from solution. The precipitate is filtered and then washed with a 5% sodium carbonate solution. The adduct is then placed in boiling alcohol such as a lower alkyl alcohol with the addition of a small quantity of concentrated mineral acid. Upon cooling, the solution produces a precipitate of pure yellow crystals of phenothiazine.

The reactants are phenothiazine and dihydropyran. Any commercial source of the secondary aromatic amine, phenothiazine, is employed. The impurities in the amine do not interfere with the formation of the derivative or adduct which precipitates spontaneously from ether solution.

We have found that when phenothiazine was placed in ether containing a twofold excess of dihydropyran and a catalytic amount of a concentrated mineral acid such as sulfuric, hydrochloric, and phosphoric was added, a mildly exothermic reaction occurred. The phenothiazine rapidly dissolved and after four minutes the derivative began to precipitate.

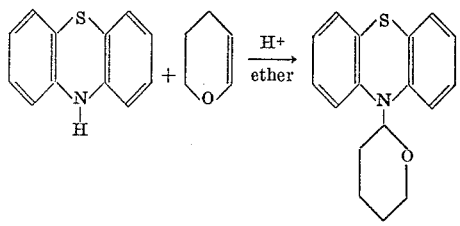

An analytical sample was prepared by recrystallization from acetonitrile.

The proposed structure of this derivative has been confirmed by infrared, ultraviolet and nuclear magnetic resonance spectroscopy. The infrared spectrum showed no N–H band in the 3400 cm.$^{-1}$ region present in phenothiazine at 3390 cm.$^{-1}$) but contained a strong C–O stretching band at 1070 cm.$^{-1}$. In the NMR spectrum, complex multiplets occurred at 7.1, 4.9, 4.0 and 1.66 p.p.m. relative to tetramethylsilane. The integrated strengths of these peaks were in the expected ratio of 8:1:2:6.

This dihydropyran derivative was easily decomposed to regenerate phenothiazine. The compound was dissolved in boiling ethanol and a catalytic amount of a concentrated mineral acid such as hydrochloric or phosphoric acid was added. As the solution cooled, yellow crystals of phenothiazine precipitated.

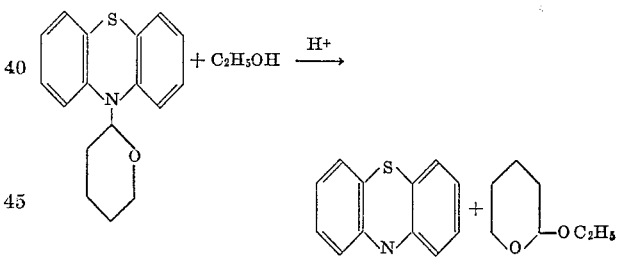

The formation of the dihydropyran derivative and its subsequent decomposition offer a convenient and rapid method for the purification of phenothiazine. Furthermore, this procedure, in contrast with other methods, only required a single recrystallization for furnishing phenothiazine having a high purity.

The following specific example is illustrative of the way in which the process of this invention may be carried out, but it is to be understood that the invention is not limited thereto.

Example I

To a slurry of 15.0 g. (0.0755 mole) of phenothiazine in 20 ml. of anhydrous ether was added 13.8 g. (0.164 mole) of dihydropyran and one drop of concentrated sulfuric acid. (Sp. Gr. 1.84). The phenothiazine dissolved completely within 30 seconds and a mildly exothermic reaction continued for two minutes. After four minutes, the adduct began to precipitate from solution. It was then filtered and washed with 250 ml. of 5% sodium carbonate solution. The adduct was then placed in 50 ml. of boiling ethanol and a drop of concentrated sulfuric (Sp. Gr. 1.84) acid was added. The solution instantly turned dark brown and the adduct dissolved completely. As the solution cooled, yellow crystals of phenothiazine precipitated. A total of 10.6 g. (quantitative yield) was obtained. After drying, the crystals had M.P. 183–185°. The proposed structure of the adduct (M. P. 156–157°) was confirmed by analytical and spectroscopic methods.

*Analysis.*—Calc. for $C_{17}H_{17}$ NOS. C, 72.05; H, 6.05; S, 11.31. Found: C, 72.1; H, 5.8; S, 11.4.

Our process can be adapted for use in the purification of other aromatic secondary amines such as phenoxazines and diphenylamines.

We claim:

1. A process for the purification of phenothiazine comprising the following steps:
   (a) adding the reactant 2,3-dihydropyran in a twofold excess amount and a catalytic amount of a concentrated mineral acid taken from the group consisting of sulfuric acid, hydrochloric acid, and phosphoric acid to a slurry of phenothiazine in an anhydrous organic solvent selected from the group consisting of ether, tetrahydrofuran, dimethylformamide, and dimethylsulfoxide;
   (b) filtering the formed adduct and washing said adduct with an aqueous solution of about .5% sodium carbonate;
   (c) adding said adduct to a boiling lower alkyl alcohol solvent and then adding a catalytic amount of a concentrated mineral acid taken from the above group;
   (d) recovering the pure crystals of phenothiazine precipitated at ambient temperature.

2. The process as defined in claim 1 wherein the reaction contains a twofold excess of 2,3-dihydropyran.

3. The process as defined in claim 2 wherein the anhydrous organic solvent is ether.

4. The process as defined in claim 3 wherein the mineral acid is concentrated sulfuric acid.

5. The process as defined in claim 4 wherein the boiling organic solvent is ethanol.

References Cited

Vaughan et al., J. Org. Chem., vol. 31, p. 1983 (1966).

JOHN D. RANDOLPH, *Primary Examiner.*

WALTER A. MODANCE, *Examiner.*

H. I. MOATZ, *Assistant Examiner.*